(No Model.)

G. VALIANT.
SEAM FOR BOOTS AND SHOES.

No. 298,637. Patented May 13, 1884.

Witnesses.
F. B. Fetherstonhaugh
Chas. C. Baldwin

Inventor.
George Valiant
by Donald C. Ridout & Co
attys

UNITED STATES PATENT OFFICE.

GEORGE VALIANT, OF TORONTO, ONTARIO, CANADA.

SEAM FOR BOOTS AND SHOES.

SPECIFICATION forming part of Letters Patent No. 298,637, dated May 13, 1884.

Application filed September 28, 1883. (No model.) Patented in Canada October 15, 1883, No. 17,882.

*To all whom it may concern:*

Be it known that I, GEORGE VALIANT, of the city of Toronto, in the county of York, in the Province of Ontario, Canada, manufacturer of boots and shoes, have invented certain new and useful Improvements on Seams for Fine Boots; and I do hereby declare that the following is a full, clear, and exact description of the same.

The object of the invention is to make a seam for fine boot and shoe uppers, having a smooth inner surface, with a finished beaded or stayed outer edge; and it consists, essentially, in turning over the edges to be joined together, so as to form a bead on each edge, the said beads being joined together by a row of stitches passing through the leather below the upper surface of the beads, and when a stay is to be formed the beads thus formed and joined together are turned back and stitched down by a row of stitches running parallel with the center seam, thus forming a finished stay.

Figure 1:
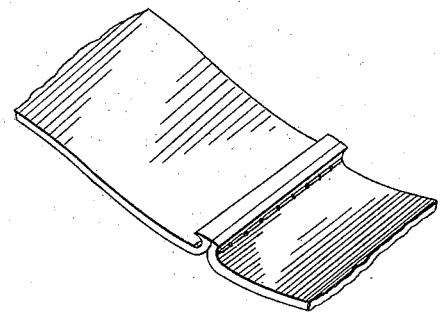
Figure 2:
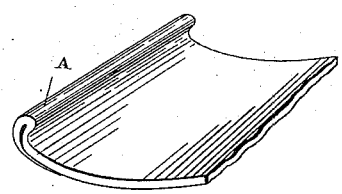
Figure 3:
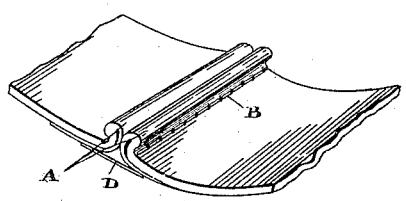
Figure 4:
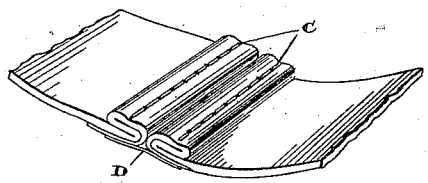

Figure 1 shows an enlarged view of a seam made in the present style. Fig. 2 is an enlarged view showing the beaded edge. Fig. 3 is an enlarged view showing the beaded edges joined together. Fig. 4 is an enlarged view showing the beaded edges joined together and turned back to form the stay.

To form a seam, as shown in Fig. 1, the edges to be joined together are turned inwardly, and the row of stitches is made on the inside of the leather. This leaves a protruding edge on the inside of the boot, which edge may be turned over and flattened out as much as possible, in order to make the boot wearable; but even when the edges thus joined together are skived in the most careful manner, a rough uncomfortable seam is still left, and, moreover, the strain on the seam has a tendency to expose the stitches of the seam, which renders them more liable to wear than if they were properly protected.

In order to produce my improved seam, I first skive the edges to be joined together to make a more finished job, although the skiving might be dispensed with. I then turn over the edge, so as to form a bead, with the outer surface of the leather exposed. When the two edges to be joined together have a bead, A, thus formed on them, I stitch them together by a row of stitches, B, passing through the four thicknesses of leather below the upper surfaces of the beads. The seam formed in this manner has a finished appearance on the outside, while the inside is perfectly smooth. Moreover, the beads projecting above the stitches form a perfect protection to them, so that no wear can be directed against them.

When it is desired to form a stay on the outside of the seam, instead of sewing a separate piece over the seam, as is necessary in order to stay the seam shown in Fig. 1, I simply turn back the beads A to switch them onto the upper surfaces by a row of stitches, C, running parallel with the seam. This latter row of stitches may also be carried through the inside stay, D, and in this manner the strain which would otherwise be exerted on the row of stitches B would be exerted on the two rows of stitches, C, and thus form a stronger and more complete seam than the old style. A further advantage of an outer seam made according to my invention is that in case of a seam ripping it can be readily repaired, as it is on the outside of the boot, and if neatly done the seam thus repaired can be made to look as good as new.

What I claim as my invention is—

1. A seam formed from two pieces of material by first folding in the edges of each piece upon itself, then uniting the two pieces by a line of stitches passing through the doubled or folded portions, and leaving outer projecting beads, substantially as set forth.

2. A seam formed from two pieces of material by first passing a line of stitches laterally through the two folded edges, leaving outer projecting beads, then passing a vertical line of stitches through each projecting bead, thus forming a stay covering the first line of stitches, substantially as set forth.

Toronto, September 25, 1883.

GEORGE VALIANT.

In presence of—
CHAS. C. BALDWIN,
E. M. CHADWICK.